(12) United States Patent
Smith et al.

(10) Patent No.: US 6,934,258 B1
(45) Date of Patent: Aug. 23, 2005

(54) QUALITY OF SERVICE BASED TRANSITIONING BETWEEN ALTERNATE TRANSPORT PATHS

(75) Inventors: Kevin R. Smith, Allen, TX (US); Theodore E. Edwards, Plano, TX (US); Richard L. West, Hendersonville, TN (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/579,954

(22) Filed: May 26, 2000

Related U.S. Application Data

(60) Provisional application No. 60/136,213, filed on May 26, 1999.

(51) Int. Cl.[7] ............................................. H04L 12/66
(52) U.S. Cl. ...................................... 370/238; 370/352
(58) Field of Search ................................ 370/352, 353, 370/354, 355, 356, 395.1, 395.2, 395.21, 370/395.4, 395.42, 395.43, 395.52, 401, 370/235, 236, 237, 238, 238.1, 395.41

(56) References Cited

U.S. PATENT DOCUMENTS

| | | | |
|---|---|---|---|
| 5,335,105 A | | 8/1994 | Carlton ........................ 359/135 |
| 5,732,078 A | * | 3/1998 | Arango ........................ 370/355 |
| 5,809,128 A | * | 9/1998 | McMullin .............. 379/215.01 |
| 6,064,653 A | * | 5/2000 | Farris .......................... 370/237 |
| 6,137,792 A | * | 10/2000 | Jonas et al. .................. 370/354 |
| 6,363,065 B1 | * | 3/2002 | Thornton et al. ........... 370/352 |
| 6,412,006 B2 | * | 6/2002 | Naudus ....................... 709/227 |
| 6,574,216 B1 | * | 6/2003 | Farris et al. ................ 370/352 |
| 6,584,098 B1 | * | 6/2003 | Dutnall ........................ 370/354 |
| 6,608,832 B2 | * | 8/2003 | Forslow ....................... 370/353 |

OTHER PUBLICATIONS

T.F. Houghton, et al., *A Packet Telephony Gateway for Public Network Operators*, Sep. 21, 1997, XVI World Telecom Congress Proceeds, pp. 35-44.

* cited by examiner

*Primary Examiner*—Kwang Bin Yao

(57) ABSTRACT

An existing communication occurring over a first type network may be communicated in high quality manner over another network when the quality of service of the first type network deteriorates. A real-time communication, such as a telephone call or other streaming data, may be automatically switched between various communication paths based on the quality of service of one of the paths. The communication paths may be internet protocol paths, circuit switched paths or other communication paths that support real-time communication of data.

58 Claims, 6 Drawing Sheets

QUALITY OF SERVICE BASED TRANSITIONING BETWEEN ALTERNATE TRANSPORT PATHS

RELATED APPLICATION

This application claims priority benefit to U.S. Provisional Patent Application No. 60/136,213, entitled "QOS Initiated Transitioning Between Preferred and Alternate Transport Paths", filed on May 26, 1999.

TECHNICAL FIELD

The present invention relates to improving the quality of service of data transmissions, and more particularly, to ensuring a certain level of the quality of service of time sensitive data transmissions over networks.

BACKGROUND

Conventionally, voice communication between different locations has occurred over a public switched telephone network (PSTN), which has proven to be a high quality and reliable medium for communication. However, when communicating via PSTNs from one local calling area to another, long distance toll charges are incurred. For businesses that have remote offices in various local calling areas and which require communication among the offices, significant long distance toll charges can accrue.

A proposed alternative to communicating voice over a PSTN is communicating voice over a packet network, such as a local area network (LAN) or wide area network (WAN). A widely used WAN is the Internet, which may be generally referred to as a voice over internet protocol (VOIP) network because of its voice communication capabilities. Information is communicated over the Internet in the form of a formatted unit of data called a packet using Transmission Control Protocol/Internet Protocol (TCP/IP). In a VOIP network, voice is packetized then communicated over the network. An advantage of communicating voice over the Internet is the elimination of long distance toll charges when communicating between different local calling areas. By using the Internet as the medium of communication for voice, businesses can save significant toll expenses. However, one drawback of the Internet is its unregulated access and indeterminate bandwidth.

Because vast numbers of computer users have access to the Internet, the amount of network traffic can increase substantially at certain times of the day and at any given moment, which may thereby overload the network. As a result, data packets being transported over the network may be delayed or even lost. The extent to which data packets are delayed or lost can be quantified to provide a relative quality of service (QOS) measure that indicates the suitability of the network to deliver packets in a timely and/or acceptable manner. Delayed delivery of data packets is not typically acceptable during a live conversation because the delay causes broken or staggered speech delivery. Consequently, when the network QOS is poor, the communicating parties are often forced to terminate their Internet-based call and to initiate more traditional telephone network-based calls.

To help remedy the QOS problem that may arise in an IP network, one type of voice communication system utilizes an IP network in combination with a PSTN. In this system, at the time of call initiation, the system determines whether the QOS of the IP network meets an acceptable QOS standard. If the QOS of the IP network is acceptable at call initiation, the call is routed via the IP network. Otherwise, the call is routed over the PSTN. While this system is helpful at the time of call initiation, this system does not remedy a reduction in the QOS for an Internet-based telephone call when the voice communication is in progress over the Internet. Consequently, in this type system, when the QOS for a voice communication unacceptably deteriorates during the communication, the communicating parties must terminate the IP-based telephone call and place another call via a PSTN.

Thus, there is a need for a system that enables an existing communication occurring over a WAN, such as an IP network, to be communicated in high quality manner when the quality of service of the WAN deteriorates.

SUMMARY OF THE INVENTION

Generally described, systems or methods consistent with the present invention enable an existing communication occurring over a first type network to be communicated in high quality manner over another network when the quality of service of the first type network deteriorates. Such systems and methods enable a time sensitive (e.g. real-time) communication, such as a telephone call or other streaming data, to be automatically switched between various communication paths based on the quality of service of one of the paths.

More specifically, a system or method consistent with the present invention evaluates data communication routing paths for use in routing time sensitive (e.g. real-time) communications over the paths. Such systems and methods evaluate whether the quality of data transmission over a first type communication path is acceptable and switches the time sensitive communication from the first type communication path to a second type communication path if the quality of transmission is not acceptable.

The switching of the time sensitive communication may occur from an internet network to a circuit switched telephone network. The time sensitive communication may include a voice communication, such as a telephone call, or other types of time sensitive communication. Additionally, a time sensitive communication may be switched from the second type communication path to the first type communication path if the quality of transmission over the first type communication path is acceptable.

The quality of service of the first type communication path is determined by transmitting data packets across the first type transmission path. Data packet delay and loss may be evaluated. Such systems and methods may determine the importance of a plurality of the communications and prioritize switching of the communications from the first type communication path to the second type communication path based on the importance of the communications. A certain amount of the second type communication path may be reserved for receiving switched higher importance communications.

In another aspect consistent with the present invention, a system or method evaluates whether the quality of data transmission over a first type communication path is acceptable and switches a time sensitive communication from a second type communication path to the first type communication path if the quality of transmission over the first type communication path is acceptable. The first type communication path may be an internet protocol network and the second type communication path may be a circuit-switched network.

In another aspect consistent with the present invention, the quality of data transmission over a first type communication path is evaluated and a time sensitive communication is switched back and forth between the first type communication path and a second type communication path based on the quality of service of the first type communication path. The time sensitive communication may be switched back and forth between an internet network and a circuit switched telephone network.

In another aspect consistent with the present invention, the quality of telephone call transmissions along a first type telephone call transmission path is evaluated to determine if it meets preselected criteria. If the transmission quality meets the criteria, an existing telephone call is switched from a second type telephone call transmission path to the first type telephone call transmission path when the quality of service along the first type telephone type call transmission path meets the preselected criteria.

DETAILED DESCRIPTION

A. Overview

Referring to the Figures, processes and systems consistent with embodiments of the present invention are described. A system or process consistent with the present invention transitions the communication of data between different types of transport paths based on the quality of service ("QOS") of one of the transport paths. The data may include streaming data, such as voice, audio, video or other types of data where delivery time is important. This type data may be generally referred to as streaming media. Such data communications are often transmitted from the source, received, and perceived, with respect to the transmission time from the source, in a relatively short time frame (e.g. in real-time) and may be generally referred to as time sensitive communications. In a specific embodiment, one path is designated as a preferred transport path and another path is designated as an alternate transport path. The QOS of the preferred transport path is determined by tracking data packets across the path. The QOS may be expressed in terms of packet delay or in terms of packet loss rate.

When the QOS measurement meets or falls below a preselected threshold, the data stream or streams being transmitted across the preferred transport path may be redirected to the alternate transport path. The alternate transport path may be used for a fixed period of time, for the duration of one or more redirected data streams, or until an acceptable QOS is established on the preferred transport path. If one of these conditions is met, the redirected data streams on the alternate transport paths can be transmitted back to the preferred transport path. The transport paths, between which the data streams are redirected or switched, are different types of transport paths, such as paths having different communication protocols.

In a specific operating environment, the preferred transport path may be an Internet protocol (IP) network and the alternate transport path may be a circuit-switched network, such as a public switched telephone network (PSTN). In such an environment, a system consistent with the present invention measures certain indicators of network traffic and dynamically adapts the system to ensure that a certain level of QOS is provided for a voice communication.

B. Architecture

Figure 1:
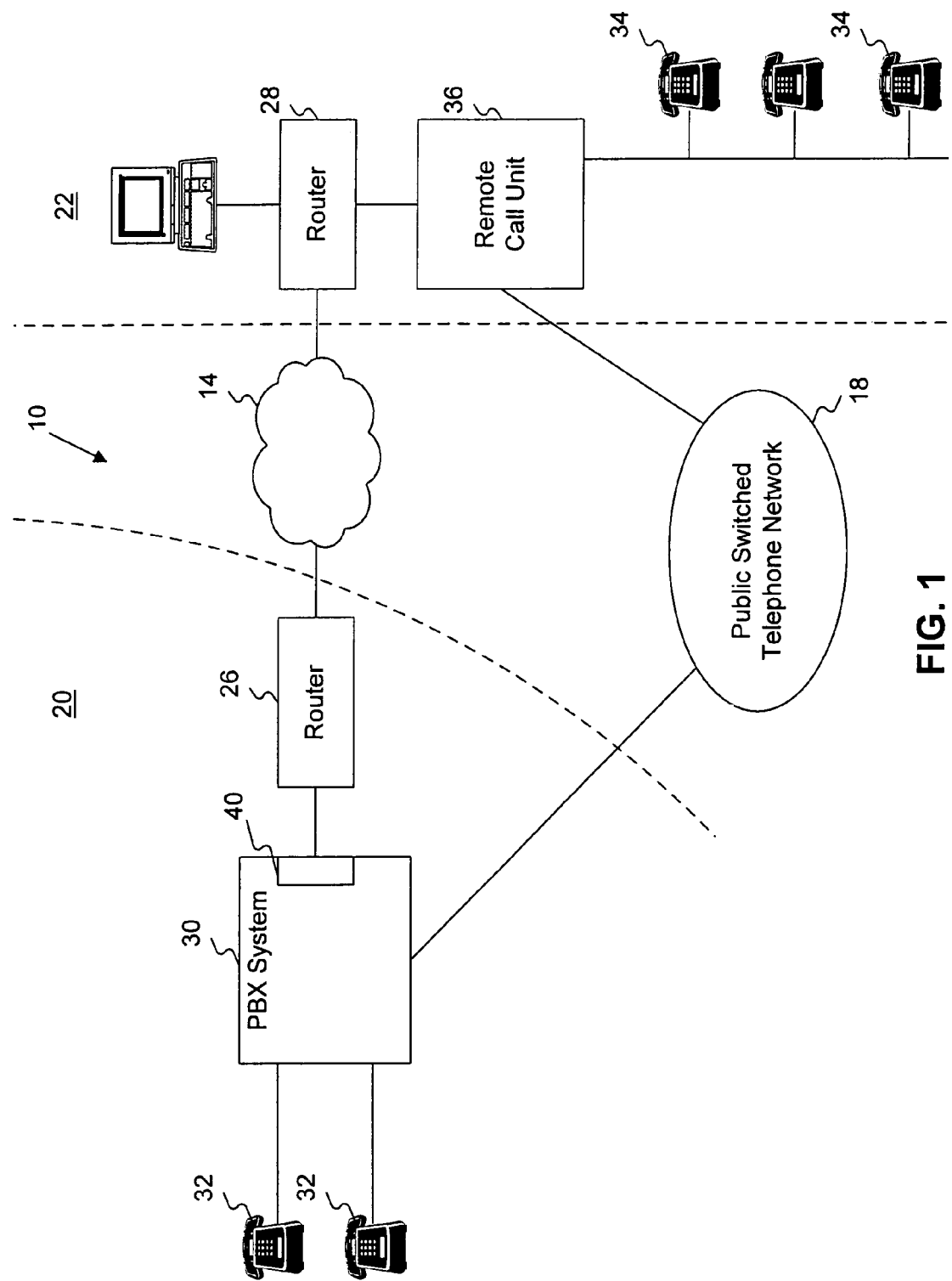
FIG. 1 is a block diagram of a system for switching data communications between data paths consistent with the present invention.

Referring to FIG. 1, an example of an alternate voice transport path system consistent with the present invention is illustrated. It should also be appreciated that although the following discussion provides examples with a specific combination of types of network paths, various combinations of different types of packet networks may be implemented consistent with the present invention. The alternate path transport system includes a packet network, such as a wide area network (WAN) 14, and a PSTN 18 for alternately transporting data between two locations based on measured QOS parameters of the preferred transport path, which in this example is the WAN 14. The WAN 14 is discussed herein as an Internet network, but may be an ATM network or other suitable packet network. The Internet is a massive set of network facilities, connected by routers, that enable various devices to communicate without regard to where they are located on the network. Information is communicated over the Internet using transmission control protocol/Internet protocol (TCP/IP), where IP specifies rules for routing data and TCP specifies rules for ensuring in sequence delivery of data. The WAN 14 is coupled between the two locations 20 and 22 via routers 26 and 28. When a telephone call is being communicated over the WAN 14 and the QOS of the WAN 14 falls below a preselected threshold, the call may be automatically switched to the PSTN 18 so that the call may be continued without interruption and with a higher QOS. If the QOS of the WAN 14 later meets a specified threshold value, telephone calls that were initiated on the PSTN 18 or that were switched to the PSTN 18 may be re-routed over the WAN 14.

A system consistent with the present invention is particularly useful in a distributed private branch exchange (PBX) environment where a PBX system 30 and associated telephones 32 are used at location 20 and where remote access to the PBX system 30 is provided at location 22 for remote telephones 34 via a remote call unit 36. A PBX system suitable for use with the present invention for handling integrated voice, data, and video is a Meridian 1 system available from Nortel Networks Corporation of Montreal Canada. The Meridian 1 enables PBX functions to be extended to remote locations by providing distributed PBX communications between the main PBX system and the remote call unit 36. The remote call unit 36 enables full featured PBX services to be provided to a selected number of users of telephones 34.

During operation, the QOS of the WAN 14 is constantly monitored at each end. When the QOS of the WAN 14 falls below a preselected threshold for a preselected duration, the system will establish a call between the host PBX system 30 and the remote call unit 36 over PSTN 18. The call to establish the PSTN connection may be initiated from either the remote location 22 by the remote call unit 36 or the host site by the PBX system 30, depending on a user selected option. Multiple PSTN connections may be established between the host and remote site depending on the bandwidth required to service all currently active calls on the WAN 14.

After the PSTN connection or connections are established, calls or voice packet streams are rerouted from the WAN 14 to the PSTN 18. The system moves as many calls as possible from the WAN 14 to the PSTN 18. If there are not enough lines or bandwidth to move all of the active calls from the WAN 14 to the PSTN 18, users identified as high priority users will have their calls moved to the PSTN 18 before lower priority calls are moved. Lower priority users' calls continue across the WAN 14 until the users terminate their calls or until additional telephone lines become available on the PSTN 18. It should be appreciated by those skilled in the art that other priority schemes such as a random scheme or first-in, first-out scheme that switches calls based on the order in which the calls where placed. New calls are routed over the PSTN 18 if circuits switched bandwidth of the PSTN 18 is available. Otherwise, new calls are blocked.

The transition between one transport path and another transport path is essentially transparent to the user, although the transition occurs during an active call or communication. The transition appears transparent to the users for several reasons: the WAN 14 and PSTN 18 transport packetized voice data; the packetized voice data is automatically reformatted for and transitioned to the particular network designated for transport based on the QOS measure; and the system 10 ensures that an acceptable communication path, between the locations 20 and 22, is established on the transport path over which the communication will be switched before switching the communication. When the call transitions from the WAN 14 to the PSTN 18 ("fall back"), the users may notice an improvement in the voice quality when the transition takes place. However, if there is a complete failure of the WAN 14, the users may notice a several second delay while the PSTN call or connection is being established.

The QOS test is continuously performed to determine when an acceptable QOS has been restored to the WAN 14. An administrator may configure a QOS threshold and a duration that the threshold is to satisfy before voice traffic will be returned to the WAN 14. By establishing a duration that the QOS must satisfy, the system prevents calls from being switched back and forth between the two transport paths during short or ephemeral improvements in the QOS of the WAN 14. After an acceptable QOS measurement is established for the specified duration, active calls are moved back to the WAN 14 and all new calls and signaling are placed over the WAN 14.

The ability to automatically transition calls between different types of transport paths is enabled in the system 10 by providing control or transceiver units, the PBX system 30 and the remote call unit 36, at the terminal ends of the transport paths at the locations 20 and 22. The transceiver units can control or ensure the set up of a communication path to a particular destination telephone over one path while the communication to that telephone is occurring over another path. The PBX system 30 and the remote call unit 36 have access to and may initiate a communication over either transport path and coordinate operations to determine which transport path should be used and when a suitable communication path has been established for the communication of data packets along the selected path.

For example, when the QOS of the WAN 14 becomes unacceptable, the PBX system 30 initiates a call to the remote call unit 36, the remote call unit 36 answers the call and the PBX system 30 and remote call unit 36 communicate to determine if an acceptable PSTN connection can be made to support the calls that need to be transferred. When the calls are routed via the PSTN 18, the PBX system 30 and remote call unit 36 continue to communicate to determine the QOS of the WAN 14. Specifically, the PBX system 30 sends data packets over the WAN 14 to the remote call unit 36 to which the remote call unit 36 responds back to the PBX system 30 to determine the QOS of the WAN 14.

During the communication of voice over the WAN 14, the QOS of the WAN 14 is determined by measuring average packet delay or packet loss rate. Average packet delay is calculated using statistics gathered from the system's jitter buffer, as known to those skilled in the art. A jitter buffer collects data packets received over the WAN 14 and is used to facilitate smooth play out of voice packet data. The statistics derived from the packets in the jitter buffer are: minimum packet holding time in the jitter buffer; maximum packet holding time in the jitter buffer; and peak holding time in the jitter buffer. By accumulating these statistics over time, the system can calculate an average packet delay value through the IP network. As the system detects an increasing trend in the average packet delay, a user-defined threshold is referenced to determine the appropriate time to fall back or transition to the PSTN connection.

Packet loss is determined by measuring the number of packets that are dropped from the network over a specified time. Lost packet measurements are maintained by accumulating packet header information and voice decoder statistics. These statistics are: voice decoder under run; voice decoder over run; out of sequence packet reception; and time stamp values in the packet header. By accumulating these statistics over time, an accurate lost packet count can be determined. When the lost packet count reaches a user selected threshold, the calls may be transitioned to the PSTN 18 as discussed herein.

When this system has reverted to using its alternate transport path, such as the PSTN 18, the IP network is continuously monitored to determine the appropriate time to restore voice traffic. Pseudo voice packets or test data packets are placed on the IP network by both the PBX system 30 and the remote call unit 36. This traffic, however, is not sent as a continuous stream but rather sent in short bursts at a high bit rate, to approximate live voice traffic. Both ends gather the statistics based on this test traffic to determine a current congestion or QOS level on the network. Using packet time stamps and sequence numbers, the following parameters are monitored during offline testing (i.e. when calls or voice communications are redirected to the PSTN): average end-to-end delay; average round trip delay; average packet-to-packet delay; and average packet loss. When these parameters fall within the user-selected IP network restoration thresholds, the voice traffic is restored to the WAN 14, as discussed above.

In addition to the user-defined fall back and restoration thresholds, the system may be set to move voice traffic to PSTN connections during specified periods of the day. This allows the user to avoid QOS degradation during known peak traffic times on the WAN 14. Additionally, user-defined options may be included that configures the system to always use the WAN network 14 or always use the PSTN connections based on the selected option.

Figure 2:
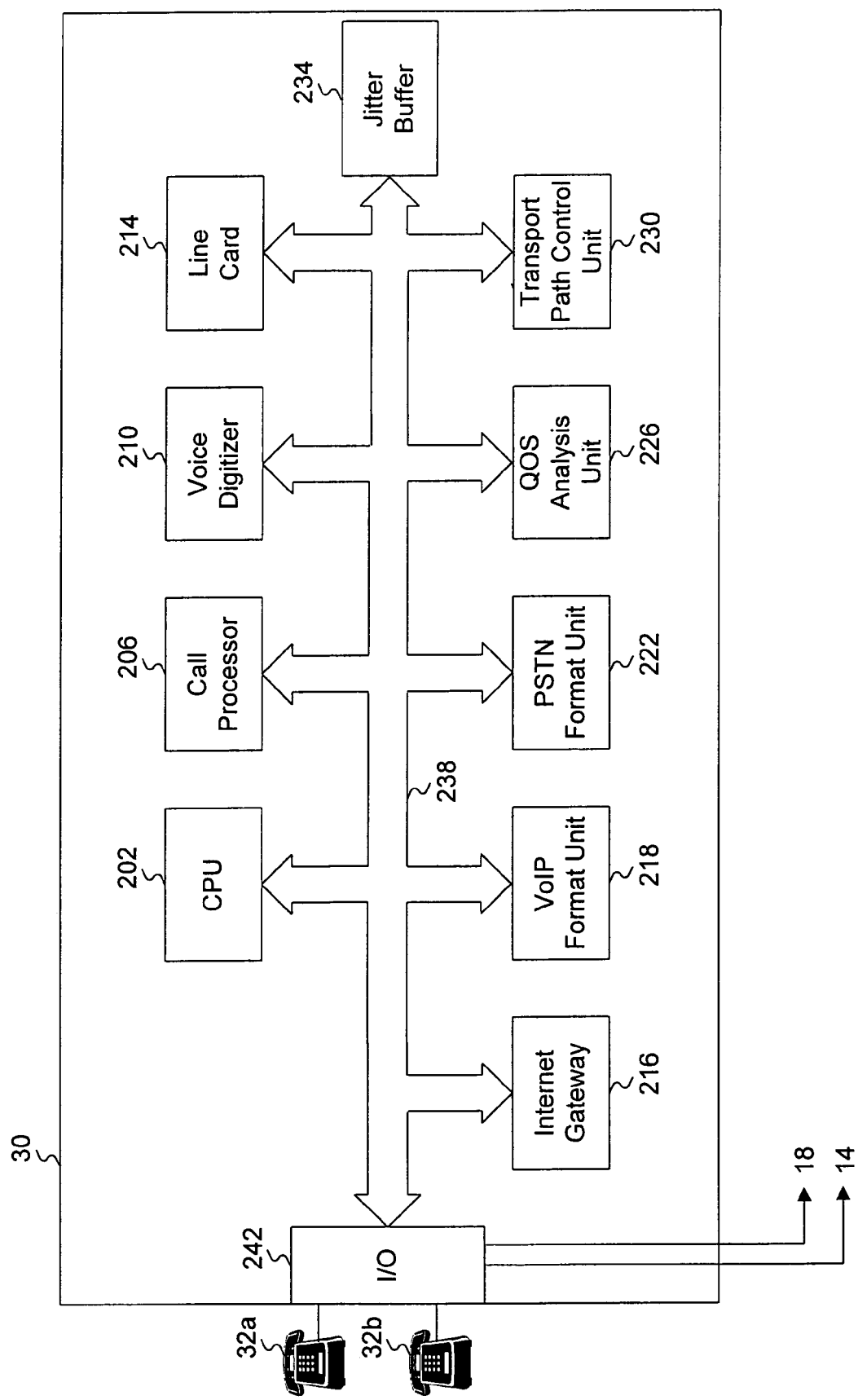
FIG. 2 is a block diagram of a PBX system transceiver consistent with the present invention.

Referring to FIG. 2, the PBX system 30 consistent with the present invention is illustrated. Many standard components of a PBX system are not shown in FIG. 2 and some components shown are simplified because they are well known and are not necessary for an understanding of the present invention. The PBX system 30 includes a central processing unit (CPU) 202, a call processor 206, a voice digitizer 210, a line card 214, Internet gateway (ITG) 216, a voice over IP (VOIP) format unit 218, a PSTN format unit 222, a QOS analysis unit 226, a transport path control unit 230, a jitter buffer 234, a PBX system bus 238, and an input/output (I/O) interface 242. Data is communicated between components of the PBX system via the PBX system bus 238. The CPU 202 in conjunction with computer programs and other circuits control the operations of the PBX system 30. It should be appreciated that many of the components illustrated may be implemented in software stored in memory modules, hardware, or a combination thereof.

The call processor 206 is a generalization of the components, known in the art, of a PBX system that receive and distribute incoming and outgoing calls. The call processor 206 receives and distributes data packets, such as voice data packets, from and to the WAN 14 and PSTN 18 via the I/O interface 242. The Internet gateway 216 processes data that is received from or output to the internet to enable the appropriate communication, as known to those skilled in the art. Voice associated with outgoing calls from the telephones 32 are digitized by the voice digitizer 210 and are directed to either the VOIP format unit 218 or the PSTN format unit 222 depending on the transport path mode selected by the transport path control unit 230. The VOIP format unit 218 formats a digitized voice packet for transmission over the WAN 14 and the PSTN format unit 222 formats digitized voice packets for transmission over the PSTN 18. The transport path control unit 230 selects the transport path mode that determines the transport path over which the data packets are to be routed. The transport path control unit 230 causes a PSTN telephone call to be initiated to the remote call unit 36 for switching calls to the PSTN 18 and causes termination of PSTN connections when the calls are switched from the PSTN to the WAN 14.

The transport path mode, either IP mode or PSTN mode, is selected based on the QOS of the WAN 14 as determined by the QOS analysis unit 226. The QOS analysis unit 226 determines the QOS of the WAN 14, as discussed above, by analyzing data collected in the jitter buffer 234. During standard operation, when the quality of service is acceptable for telephone calls over the WAN 14, IP mode is selected by the transport path control unit 230 and calls are routed over the WAN 14. Otherwise, PSTN mode is selected by the transport path control unit 230 and calls are routed over the PSTN 18. During IP mode, some calls may be routed over the PSTN 18 if the telephone numbers associated with the call are defined to be routed over the PSTN 18 at all times. If the system is in a user override mode, the calls are routed according the override mode selected, such IP or PSTN only mode. Depending on the selected user override mode, all calls may be routed by either the WAN 14 or PSTN 18.

The PBX system 30 illustrated includes an Internet gateway line card 214 which provides ports for supporting remote users. The line card 214 emulates a standard digital line card, such as the digital line card (XDLC) sold by Nortel Networks and provides PBX functionality to remote users. Each port on the line card 214 is configured in accordance with the PBX's databases so that the line card appears to be a locally connected standard digital line card to the PBX system. The line card 214 relays voice and signaling for each port to the associated telephone at the remote site, using digital trunks, an integrated 10 base T interface (voice over IP) or integrated v.35 interface (voice over frame relay). Voice data is compressed and packetized for transport regardless of the connection type being used. Voice over IP connections are supported by a 10 base T Ethernet interface for connection to the TCP/IP data network through the router or hub. Voice data is packetized and formatted as UDP/IP packets and PBX signaling data is transmitted as TCP/IP packets. When using a PSTN connection, the data is HDLC framed.

Setting up the packet communication devices of the PBX system 30 and remote call unit 36 on the line side of the internet gateway (ITG) system facilitates communication consistent with the present invention to occur. By setting up the communication on the line side of the internet gateway, the line card may dial out as a telephone to place calls to the remote call unit 36 to set up the transfer of calls to the PSTN 18.

The remote call unit 36 supports multiple digital telephone lines and may support an analog connection for fax or modem traffic. The remote call unit 36 relays voice and signaling information from the digital phones connected at the remote site to the host PBX system 30. Each port on the remote call unit 36 is passed to the host site across a basic rate ISDN trunk of the PSTN 18 or through an integrated 10 base T Ethernet voice over IP connection of the WAN 14.

Figure 3:
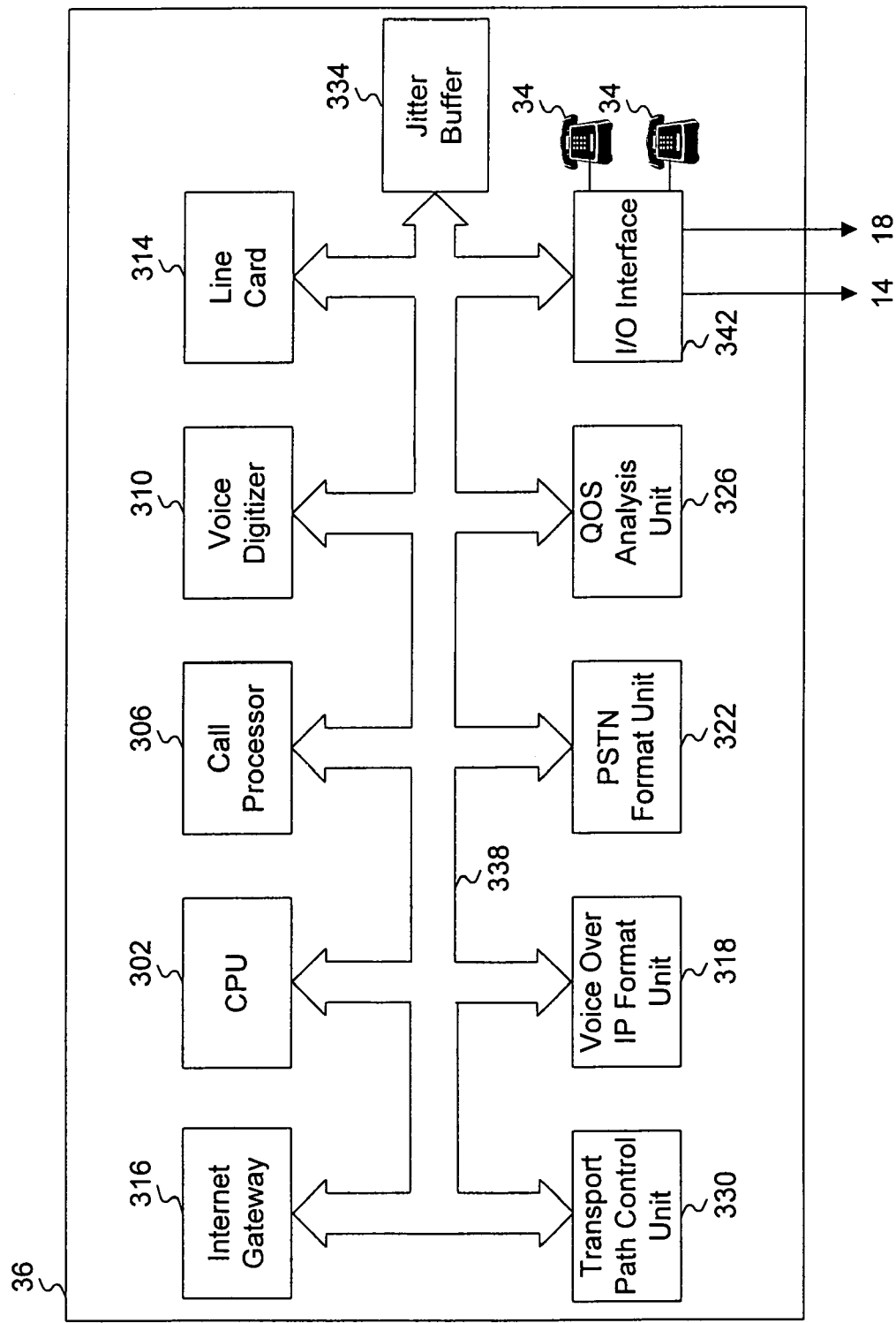
FIG. 3 is a block diagram of a remote call unit consistent with the present invention.

Referring to FIG. 3, a block diagram of the remote call unit 36 is illustrated. The remote call unit 36 has components that perform many of the functions as like or similar components of the PBX system 30. The remote call unit includes a central processing unit (CPU) 302, a call processor 306, a voice digitizer 310, a line card 314, an Internet gateway 316, a voice over IP format unit 318, a PSTN format unit 322, a QOS analysis unit 326, a transport path control unit 330, a jitter buffer 334, a call unit system bus 338, and an input/output (I/O) interface 342. These components perform the same function as similarly named components of the PBX system 30.

The transport path control unit 330 is operable to perform the same functions as the transport path control unit 230 (FIG. 2). The transport path control unit 330 directs the packetized voice from telephones 34 to the VOIP format unit 318 or PSTN format unit 322 depending on the mode determined by the PBX system, which is relayed to the remote call unit 36. The remote call unit 36 receives a signal from the PBX system 30 to enable the appropriate switching of data paths and signals at the remote call unit 30. When PSTN or IP packets are received at the remote call unit 36, the packets are directed to appropriate format unit for translation.

Figure 4:
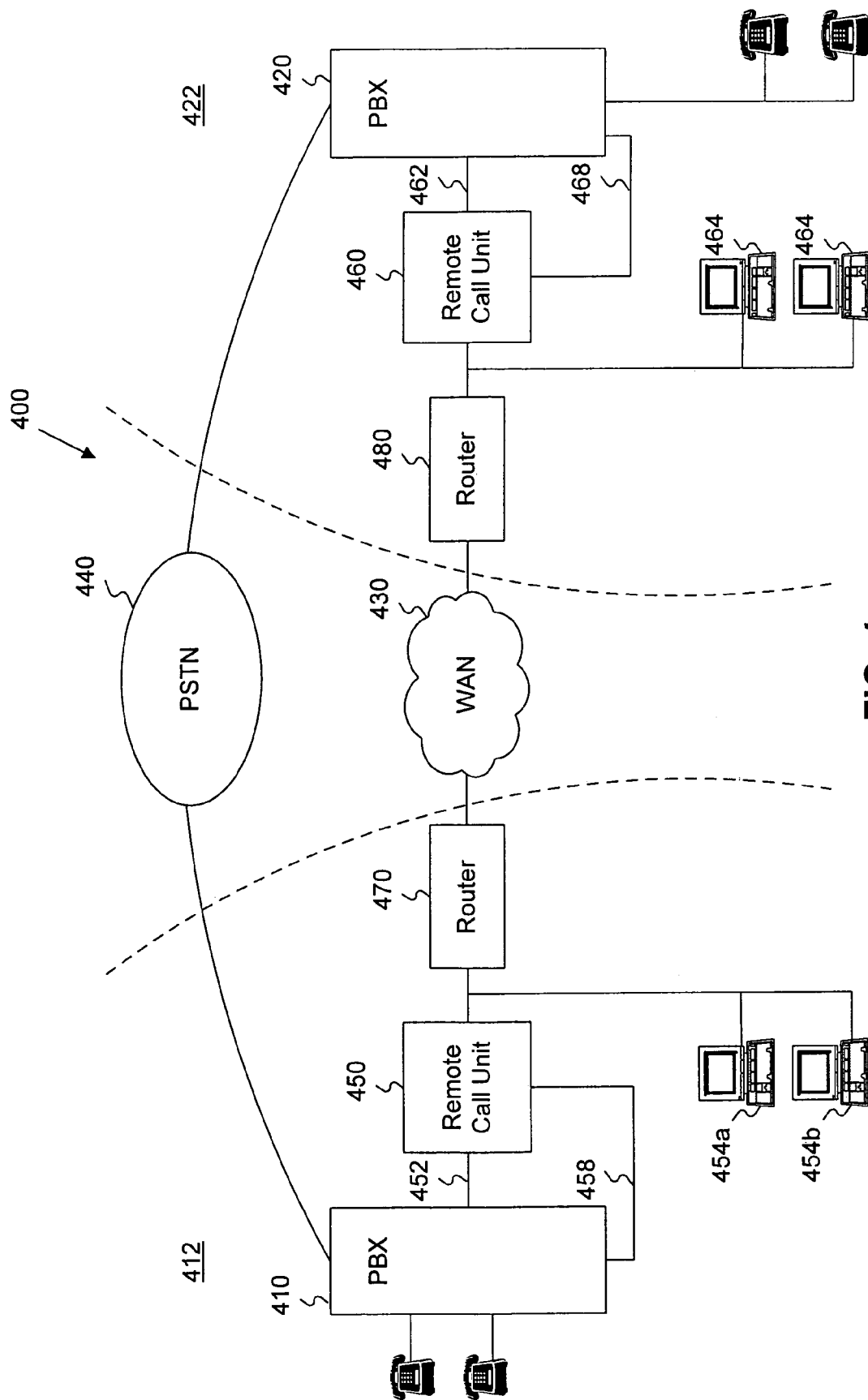
FIG. 4 is a block diagram of another embodiment consistent with the present invention for switching data communications between data paths.

Referring to FIG. 4, another embodiment of an alternate path transport system consistent with the present invention is illustrated. Alternate path transport system 400 includes two PBX systems 410 and 420 at locations 412 and 422, respectively, that are enabled to automatically switch an existing call or streaming data communication between a WAN 430 or PSTN 440 depending on the QOS of the WAN 430. The system 400 illustrates PBX systems that are retrofitted to be consistent with the present invention. The PBX systems 410 and 420 are trunk side ITG systems which are not able themselves to call out to another system to coordinate the transfer of calls between WAN 430 and PSTN 440 during a live or existing communication. However, the PBX systems 410 and 420 at each location 412 and 422 have been coupled to remote call units 450 and 460, as described in connection with FIG. 3, to enable the PBX systems 410 and 420 to operate consistent with the present invention.

The remote call units 450 and 460 are coupled between the PBX systems 410 and 420 and the WAN 430 and operate as line side internet gateway systems. The remote call units 450 and 460 enable control over both the terminal ends of WAN 430 and PSTN 440 connections between the two locations 412 and 422. Routers, such as routers 470 and 480, route data traffic of the PBX systems 410 and 420 and computer systems 454 and 464 over the WAN 430. A typical PBX system configured for communication of voice over IP sets up calls to be routed either as VOIP calls or PSTN calls at the time of call initiation. In the system 400, the remote call units 450 and 460 are positioned between the routers 470 and 480 and the PBX systems 410 and 420 to coordinate the switching of telephone calls between the two transport paths during a communication. By coupling the remote call units 450 and 460 to the PBX systems, the line side and the internet gateway associated with the voice communication can automatically control switching between two types of transport paths during an existing communication. The PBX systems 410 and 420 are coupled to the remote call units 450 and 460 via dedicated LAN connections 452 and 462 and also are coupled to the remote call units 450 and 460 via telephone line connections 458 and 568.

Either remote call unit 450 or 460 may monitor the quality of service of the WAN similar to the manner discussed above in connection with the PBX system 30. For example, the remote call unit 450 may be designated as the primary or switching remote call unit and when the QOS of the WAN falls below a preselected threshold, the remote call unit 450 places a call to the other remote call unit 460 over the PSTN 440 via the PBX system 410 through telephone line 458. The remote call units 450 and 460 handshake, via the telephone lines 458 and 468 over the PSTN 440, to set up transfer of calls from the WAN 430 to the PSTN 440. When calls are transferred from the WAN 430 to the PSTN 440, the remote calls units continue to monitor the QOS of the WAN 430 by communicating pseudo voice traffic to determine packet delay and loss as discussed above. When the QOS of the WAN 430 returns to an acceptable quality, the remote call unit 450 transitions the calls from the PSTN 440 back to the WAN 430.

C. Processes

Figure 5A:
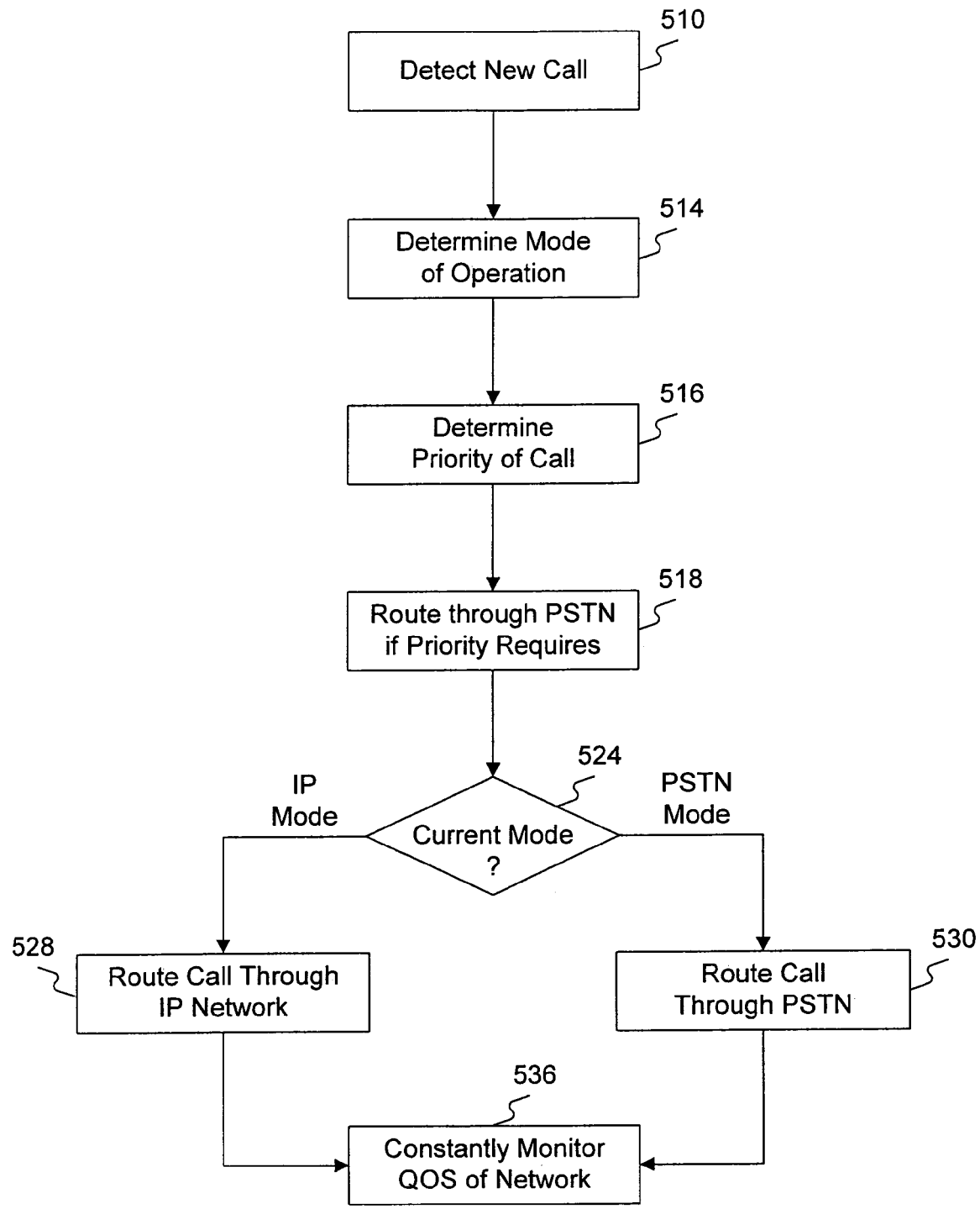
FIGS. 5a and 5b are flow diagrams consistent with the present invention.
Figure 5B:
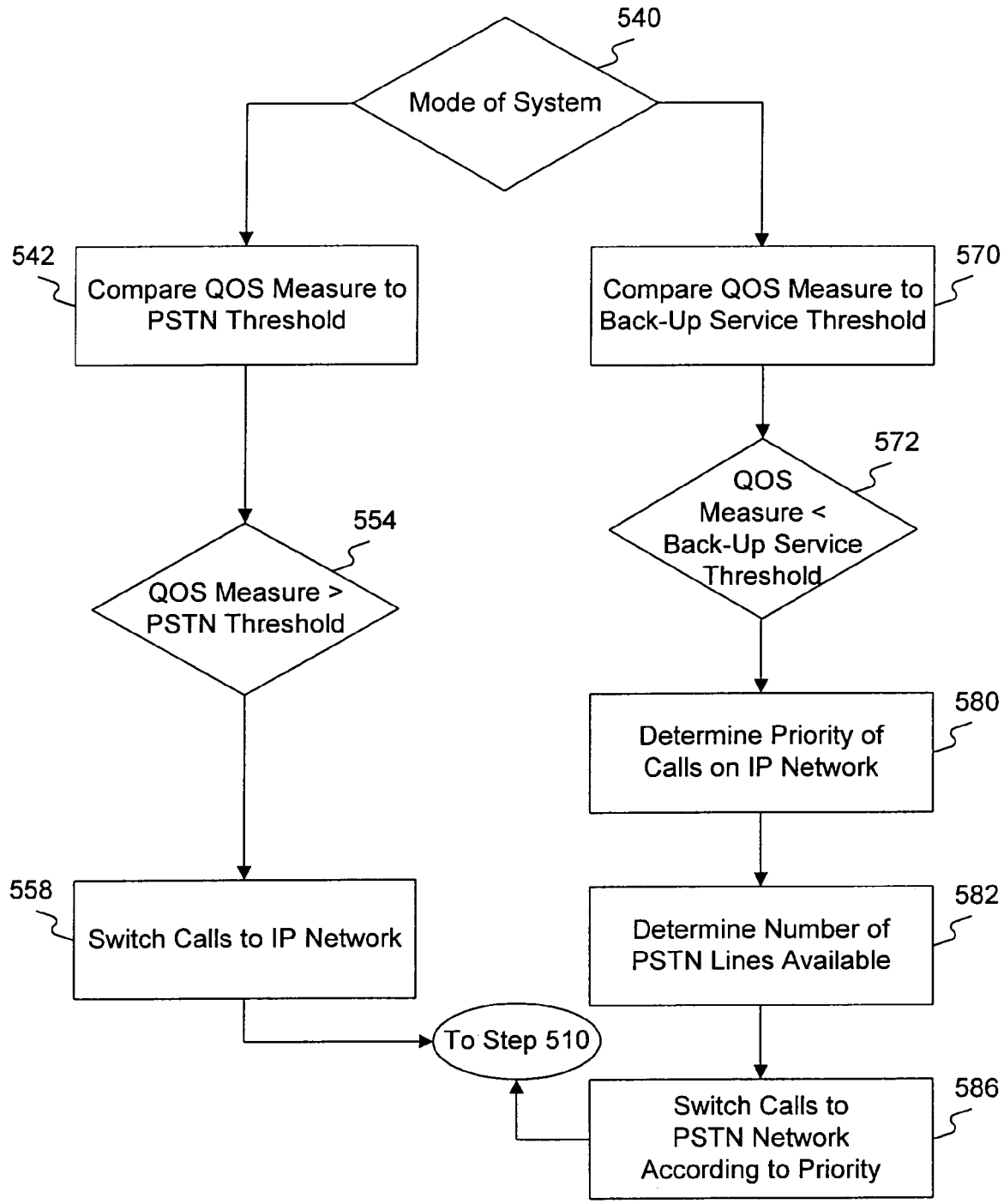

Having discussed the basic architecture of a system operating consistent with the present invention, some of the processes consistent with the present invention are discussed in conjunction with FIG. 5. Referring to FIG. 5, a flow diagram of the processes consistent with the present invention is illustrated. When a telephone caller goes off hook (step 510) and dials a number, the mode of operation of the alternate transport system is determined (step 514) and the priority of the dialing number and dialed number is determined (step 516). For the initial calls, the system may be initialized to a user selected mode. As discussed herein, telephone calls on certain telephone lines may be designated as high priority calls. Certain high priority calls are routed through the PSTN always, regardless of the mode of operation of the system (step 518). If the system is operating in PSTN mode and all PSTN lines are being used, new calls are blocked. It should be noted that a certain amount of PSTN lines or bandwidth may be reserved for high priority calls.

For calls that may be transported by either the preferred transport path or via the alternate transport path, the mode of operation (IP or PSTN) of the alternate transport path system is evaluated (step 524). If the mode is IP mode (step 524), the call is routed through the WAN (step 528). If, however, the mode is PSTN mode (step 524), the call is routed through the PSTN network (step 530). By routing the call through the PSTN network when the QOS on the preferred network is below the predefined threshold, a higher QOS of the call can be ensured. After a call or calls have been initiated on either network, the system constantly monitors the QOS of the WAN based on the mode of operation (step 536).

Depending on the mode of operation (IP or PSTN mode) (step 540) of the alternate transport path control system, functions performed and thresholds monitored may vary. When the system is operating in PSTN mode (step 542), the QOS measure is compared to an PSTN mode threshold. The PSTN mode threshold is used to determine when calls that are currently being transported on the PSTN network are to be switched back to the IP network. The IP mode threshold may include two measurements: the actual QOS as measured by analyzing data packets and the length of time that the QOS has been maintained above a specified threshold. The length of time measure is used to avoid switching PSTN calls back to the IP network based on a QOS measure that was a momentary improvement.

The QOS measure is compared with the PSTN mode threshold (step 554) and if the QOS measure is not greater than the PSTN mode threshold, calls are allowed to continue on the PSTN network (to step 510). If, however, the QOS measure is greater than the PSTN mode threshold, the PSTN calls which are not required to be communicated over the PSTN network at all times are switched to the preferred or IP network (step 558).

When the alternate transport path control system operates in the IP mode (step 540), the QOS measure is compared to a back-up service or IP mode threshold (step 570). The back-up service threshold is the value that quantifies the minimum level of QOS that is acceptable on the IP network. If the QOS measure is greater than or equal to the back-up service threshold, the calls that are currently being transported across the IP network are allowed to continue across the network (to step 510).

If the QOS measure is less than the back-up service threshold (step 572), the existing telephone calls are identified for potential switching to the PSTN network. For the current calls being transported over the IP network 14, the priority value, if any, is determined for the calls (step 580). The system also determines the number of PSTN lines available for the calls (step 582). The number of calls switched from the IP network to the PSTN lines typically equals the number of available PSTN lines. Calls are switched to the PSTN network in the order of priority to ensure that high priority calls are transferred to the PSTN network (step 586). Although only two types of transport paths have been discussed in detail, it should be appreciated that other types of transport paths may be used in connection with the present invention. Additionally, it should be appreciated that a system operating consistent with the present invention may switch an existing communication among two or more transport paths based on QOS criteria selected for the transport paths.

While there has been illustrated and described what are at present considered to be a preferred embodiment and method of the present invention, it will be understood by those skilled in the art that various changes and modifications may be made, and equivalents may be substituted for elements thereof without departing from the true scope of the invention.

Modifications may be made to adapt a particular element, technique, or implementation to the teachings of the present invention without departing from the spirit of the invention. Although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM.

Therefore, it is intended that this invention not be limited to the particular embodiment and method disclosed herein, but that the invention include all embodiments falling within the scope of the appended claims.

What is claimed is:

1. A method of evaluating data communication routing paths for use in routing time sensitive communications over the paths, comprising the steps of:
   evaluating whether the quality of data transmission over a first type communication path is acceptable;
   determining the importance of a plurality of time sensitive communications; and
   switching an in-progress time sensitive communication from the first type communication path to a second type communication path based on the determined importance of the time sensitive communication if the quality of transmission is not acceptable.

2. The method of claim 1 wherein said step of switching comprises switching said time sensitive communication from an internet network to a circuit switched telephone network.

3. The method of claim 1 wherein said time sensitive communication includes audio data.

4. The method of claim 3 wherein said time sensitive communication is a telephone call.

5. The method of claim 1 wherein said time sensitive communication is a video communication.

6. The method of claim 1 further comprising the step of switching an in-progress time sensitive communication from the second type communication path to the first type communication path if the quality of transmission over the first type communication path is acceptable.

7. The method of claim 6 wherein said first type communication path is a internet protocol network and said second type communication path is a circuit-switched network.

8. The method of claim 1 wherein said step of switching comprises switching time sensitive communications determined to be more important to the second type communication path before less important time sensitive communications are switched.

9. The method of claim 8 further comprising reserving a certain amount of communication conduits of the second type communication path for selected higher importance time sensitive communications.

10. The method of claim 9 wherein said time sensitive communications are telephone calls.

11. The method of claim 1 wherein said step of evaluating comprises evaluating the transmission of data packets across the first type transmission path to determine if the quality of transmission is acceptable.

12. The method of claim 11 wherein data packet delay is evaluated.

13. The method of claim 12 wherein data packet loss is evaluated.

14. The method of claim 1 wherein the first and second type communication paths are packet networks.

15. The method of claim 14 wherein the second type network is an ATM network.

16. The method of claim 14 wherein the first type network is an ATM network.

17. A method of evaluating data communication routing paths for use in routing time sensitive data over the paths, comprising the steps of:
   evaluating whether the quality of data transmission over a first type communication path is acceptable;
   identifying in-progress time sensitive communications that can be switched from a second type communication path to the first type communication path; and
   switching a one of the identified in-progress time sensitive communications from a second type communication path to the first type communication path if the quality of transmission over the first type communication path is acceptable.

18. The method of claim 17 wherein said first type communication path is a packet network and said second type communication path is a circuit-switched network.

19. The method of claim 18 wherein said packet network is an internet protocol network.

20. The method of claim 17 wherein the first and second type network are packet networks.

21. The method of claim 17 wherein said time sensitive communication includes voice data.

22. The method of claim 21 wherein said time sensitive communication is a telephone call.

23. The method of claim 17 wherein said step of evaluating comprises evaluating the transmission of data packets across the first type communication path to determine if the quality of transmission is acceptable.

24. The method of claim 23 wherein data packet delay is evaluated.

25. The method of claim 24 wherein data packet loss is evaluated.

26. A computer readable medium, used in evaluating data communication routing paths for use in routing time sensitive communications over the paths, including instructions which when executed by a computer system, perform the steps of:
   evaluating whether the quality of data transmission over a first type communication path is acceptable;
   determining the importance of a plurality of time sensitive communications; and
   switching an in-progress time sensitive communication from the first type communication path to a second type communication path based on the determined importance of the time sensitive communication if the quality of transmission is not acceptable.

27. The medium of claim 26 wherein said step of switching comprises switching said time sensitive communication from an internet network to a circuit switched telephone network.

28. A computer readable medium, used in evaluating data communication routing paths for use in routing time sensitive communications over the paths, including instructions which when executed by a computer system, perform the steps of:
   evaluating whether the quality of data transmission over a first type communication path is acceptable;
   identifying in-progress time sensitive communications that can be switched from a second type communication path to the first type communication path; and
   switching a one of the identified in-progress time sensitive communications from a second type communication path to the first type communication path if the quality of transmission over the first type communication path is acceptable.

29. The medium of claim 28, wherein said time sensitive communication is switched from a circuit-switched network to an internet protocol network.

30. A computer-implemented method of evaluating data communication routing paths for use in routing time sensitive communications over the paths, comprising the steps of:
evaluating the quality of data transmission over a first type communication path;
determining the importance of a plurality of time sensitive communications; and
switching an in-progress time sensitive communication back and forth between the first type communication path and a second type communication path based on the quality of transmission over the first type communication path and on the determined importance of the time sensitive communication.

31. The method of claim 30 wherein said step of switching comprises switching said time sensitive communication back and forth between an internet network and a circuit switched telephone network.

32. The method of claim 31 wherein the quality of transmission of the internet network is evaluated for an acceptable quality for voice transmission.

33. The method of claim 32 comprising transmitting voice communication over the internet network when the quality of data transmission is acceptable, and transmitting the voice communication over the circuit switched network when the quality of transmission is not acceptable.

34. A method of evaluating telephone call routing paths for use in routing a telephone call, comprising:
determining whether the quality of telephone call transmissions along a first type telephone call transmission path meets preselected criteria;
identifying existing telephone calls that can be switched from a second type communication path to the first type communication path; and
automatically switching a one of the identified existing telephone calls from a second type telephone call transmission path to the first type telephone call transmission path when the quality of telephone call transmissions along the first type telephone call transmission path meets the preselected criteria.

35. The method of claim 34 wherein said switching step comprises switching voice data transmitted along the second type telephone call path to the first type telephone call path when the quality of service meets said preselected criteria.

36. The method of claim 35 wherein said determining step comprises sending test data packets along said first type telephone call path to determine the quality of service along the first type telephone call transmission path.

37. The method of claim 36 wherein said determining step comprises measuring data packet loss along said first type telephone call transmission path.

38. The method of claim 34 wherein said determining step comprises measuring data packet delay along said first type telephone call transmission path.

39. The method of claim 38 wherein said determining step comprises measuring data packet loss along said first type telephone call transmission path.

40. The method of claim 34 wherein said switching step comprises switching said existing telephone call from a circuit switched telephone call path to an internet protocol telephone call path.

41. The method of claim 34 further comprising the step of switching a telephone call that has been switched from said second type telephone call transmission path to said first type telephone call transmission path back to said second type telephone transmission call path when the quality of service along said first telephone call transmission path does not meet predetermined criteria.

42. The method of claim 41 wherein said first telephone call path is an Internet Protocol path and wherein said second type telephone call transmission path is a circuit switched telephone call path.

43. The method of claim 41 further comprising determining the number of telephone call lines available for switching telephone calls from said first type telephone call transmission path to said second type telephone path and switching only said number of calls from said first type telephone transmission call path to said second type telephone call transmission path.

44. The method of claim 43 further comprising prioritizing switching of telephone calls from said second type telephone call transmission path to said first type telephone call transmission path based on call switching criteria.

45. The method of claim 44 wherein said call switching criteria is based a telephone number associated with the calling or called party telephone line.

46. The method of claim 45 wherein certain telephone numbers are designated as higher priority telephone numbers for use in prioritizing said switching.

47. A computer-implemented method of evaluating telephone call routing paths for use in routing a telephone call, comprising:
determining whether the quality of telephone call transmissions along a first type telephone call transmission path meets preselected criteria;
determining the importance of a plurality of telephone call transmissions; and
automatically switching an existing telephone call from the first telephone call transmission path to a second telephone call transmission path based on the determined importance of the telephone call transmissions when the quality of telephone call transmissions along the first telephone call transmission path does not meet the preselected criteria.

48. A system for evaluating data communication routing paths for use in routing time sensitive communications over the paths, comprising:
a processing unit that evaluates the quality of data transmission over a first type communication path and determines the importance of an in-progress time sensitive communication; and
a switch that switches the in-progress time sensitive communication back and forth between the first type communication path and a second type communication path based on the quality of transmission over the first type communication path and on the importance of the time sensitive communication.

49. The system of claim 48 wherein said switch switches said time sensitive communication back and forth between an internet network and a circuit switched telephone network.

50. The system of claim 49 wherein the evaluator unit evaluates the quality of transmission of the internet network for an acceptable quality for voice transmission.

51. The system of claim 50 wherein the switch transmits voice communication over the internet network when the quality of data transmission is acceptable, and transmits the voice communication over the circuit switched network when the quality of transmission is not acceptable.

52. The system of claim 51 wherein the first and second type networks are packet networks.

53. An apparatus for evaluating data communication routing paths for use in routing time sensitive communications over the paths, comprising:

means for evaluating the quality of data transmission over a first type communication path;

means for determining the importance of a plurality of in-progress time sensitive communications; and means for switching an in-progress time sensitive communication back and forth between the first type communication path and a second type communication path based on the quality of transmission over the first type communication path and on the importance of the in-progress time sensitive communication.

54. The apparatus of claim 53 wherein said means for switching comprises switching said time sensitive communication back and forth between an internet network and a circuit switched telephone network.

55. An apparatus for evaluating data communication routing paths for use in routing time sensitive communications over the paths, comprising:

means for evaluating whether the quality of data transmission over a first type communication path is acceptable;

means for determining the importance of a plurality of in-progress time sensitive communications; and means for switching an in-progress time sensitive communication from the first type communication path to a second type communication path if the quality of transmission is not acceptable, based on the importance of the in-progress time sensitive communication.

56. The apparatus of claim 55 wherein said step of switching comprises switching said time sensitive communication from an internet network to a circuit switched telephone network.

57. An apparatus for evaluating data communication routing paths for use in routing time sensitive data over the paths, comprising:

means for evaluating whether the quality of data transmission over a first type communication path is acceptable;

means for identifying in-progress time sensitive communications that can be switched from a second type communication path to the first type communication path; and means for switching a one of the identified in-progress time sensitive communications from a second type communication path to the first type communication path if the quality of transmission over the first type communication path is acceptable.

58. The apparatus of claim 57 wherein said step of switching comprises switching said time sensitive communication from an internet network to a circuit switched telephone network.

* * * * *